United States Patent
Zhu et al.

(10) Patent No.: US 9,807,819 B1
(45) Date of Patent: Oct. 31, 2017

(54) CROSS-TECHNOLOGY SESSION CONTINUITY

(75) Inventors: Lei Zhu, Overland Park, KS (US); Terry Daniel Nebergall, Gardner, KS (US); Chidambaram Pavanasam, Overland Park, KS (US); Daniel J. Pope, Overland Park, KS (US); Jack Branson Sippel, II, Overland Park, KS (US); John Eric Belser, Olathe, KS (US); Joao Carlos Osorio Gouvea Teixeira de Magalhaes, Shawnee, KS (US); Jeffrey Scott Ward, Kansas City, MO (US); Sameer Akbar Khan, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1827 days.

(21) Appl. No.: 12/554,215

(22) Filed: Sep. 4, 2009

(51) Int. Cl.
*G06F 15/16* (2006.01)
*H04W 92/02* (2009.01)
*H04W 12/06* (2009.01)

(52) U.S. Cl.
CPC ............ *H04W 92/02* (2013.01); *H04W 12/06* (2013.01)

(58) Field of Classification Search
CPC .............................. H04W 92/02; H04W 12/06
USPC ......................................................... 709/227
See application file for complete search history.

(56) References Cited

U.S. PATENT DOCUMENTS

| 6,606,491 | B1 |  | 8/2003 | Peck | |
|---|---|---|---|---|---|
| 8,279,872 | B1 | * | 10/2012 | Huang et al. | 370/392 |
| 2004/0114553 | A1 | * | 6/2004 | Jiang et al. | 370/328 |
| 2005/0099981 | A1 |  | 5/2005 | Liu | |
| 2005/0197104 | A1 |  | 9/2005 | Liu et al. | |
| 2006/0209768 | A1 | * | 9/2006 | Yan | H04L 29/12311 370/338 |
| 2007/0183410 | A1 | * | 8/2007 | Song | H04M 3/42008 370/352 |
| 2007/0268873 | A1 | * | 11/2007 | Borella et al. | 370/338 |
| 2007/0281699 | A1 | * | 12/2007 | Rasanen | H04W 36/0038 455/436 |
| 2008/0032695 | A1 | * | 2/2008 | Zhu | H04W 36/0022 455/442 |
| 2008/0101291 | A1 | * | 5/2008 | Jiang et al. | 370/331 |
| 2008/0151845 | A1 | * | 6/2008 | Jaakkola | H04W 8/005 370/338 |

(Continued)

OTHER PUBLICATIONS

Feder, P.; Isukapalli, R.; Mizikovsky, S., "WiMAX-EVDO interworking using mobile IP," Communications Magazine, IEEE , vol. 47, No. 6, pp. 122,131, Jun. 2009, URL: http://ieeexplore.ieee.org/stamp/stamp.jsp?tp=&arnumber=5116809&isnumber=5116787.*

(Continued)

*Primary Examiner* — Philip Chea
*Assistant Examiner* — Wing Ma

(57) ABSTRACT

A wireless network of a first type receives a request for network entry from a mobile station. A service continuity query is sent to a service node. A service continuity response is received from the service node. The service continuity response includes a network access identifier. The network access identifier is determined to be associated with an existing session on a wireless network of a second type. The existing session is using a mobile internet protocol address. On the wireless network of the first type, a session is assigned the mobile internet protocol address.

20 Claims, 7 Drawing Sheets

(56) References Cited

U.S. PATENT DOCUMENTS

| | | | |
|---|---|---|---|
| 2008/0183645 A1* | 7/2008 | Burger | H04L 67/24 |
| | | | 706/12 |
| 2008/0205342 A1* | 8/2008 | Radhakrishnan et al. | 370/331 |
| 2008/0233951 A1* | 9/2008 | Uchida et al. | 455/425 |
| 2009/0016300 A1* | 1/2009 | Ahmavaara et al. | 370/331 |
| 2009/0073936 A1* | 3/2009 | Jentz et al. | 370/331 |
| 2009/0141683 A1* | 6/2009 | Grinshpun et al. | 370/331 |
| 2009/0175239 A1* | 7/2009 | Grinshpun et al. | 370/331 |
| 2009/0186601 A1* | 7/2009 | Hahn | 455/411 |
| 2009/0254668 A1* | 10/2009 | Jean | 709/228 |
| 2009/0323635 A1* | 12/2009 | Gras | H04W 36/0011 |
| | | | 370/331 |
| 2010/0002668 A1* | 1/2010 | Tan et al. | 370/338 |
| 2010/0035578 A1* | 2/2010 | Ahmed | 455/411 |
| 2010/0069101 A1* | 3/2010 | Mahdi | H04W 76/02 |
| | | | 455/466 |
| 2010/0091733 A1* | 4/2010 | Hahn et al. | 370/331 |
| 2010/0260105 A1* | 10/2010 | Keller et al. | 370/328 |
| 2011/0063997 A1* | 3/2011 | Gras et al. | 370/331 |
| 2015/0319159 A1* | 11/2015 | Abdul Hameed Khan | H04L 67/20 |
| | | | 726/7 |

OTHER PUBLICATIONS

"Entitle." Dictionary.com Unabridged. Random House, Inc. Oct. 17, 2014. <Dictionary.comhttp://dictionary.reference.com/browse/entitle>.*

* cited by examiner

CROSS-TECHNOLOGY SESSION CONTINUITY

TECHNICAL BACKGROUND

Wireless communication services are a popular choice for accessing a variety of communication networks. To facilitate the provision of wireless services, many standards bodies put forward a variety of wireless technologies. For example, the Institute of Electrical and Electronics Engineers (IEEE) has promulgated a number of wireless standards including the 802.11 (WiFi) standards and the 802.16 standards. The industry-led WiMAX (Worldwide Interoperability for Microwave Access) Forum further specifies applications and high-quality technical specifications based on the IEEE 802.16 standards to enable a high-performance, end-to-end Internet network architecture supporting fixed, portable, nomadic and mobile users. Likewise, the International Telecommunication Union (ITU) has also offered standards to facilitate wireless communications. This includes TIA-856, which is also known as Evolution-Data Optimized (EV-DO). The European Telecommunications Standards Institute (ETSI) has also promulgated a standard known as long term evolution (LTE). Additional standards such as the fourth generation communication system (4G) are also being pursued. These standards pursue the aim of providing a comprehensive communication solution where voice, data, and streamed multimedia can be given to users on an "anytime, anywhere" basis. These standards also aim to provide higher data rates than previous generations. All of these standards may include specifications for various aspects of wireless communication with a network. These aspects include processes for registering on the network, carrier modulation, frequency bands of operation, and message formats.

Wireless communication services offer certain advantages over wired communication for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. Mobility also provides challenges for providing access to existing public and proprietary networks including the ability to ensure that a wireless device maintains connectivity while operating in a mobile environment.

Overview

A method of operating a communication system is disclosed. A wireless network of a first type receives a request for network entry from a mobile station. A service continuity query is sent to a service node. A service continuity response is received from the service node. The service continuity response includes a network access identifier. The network access identifier is determined to be associated with an existing session on a wireless network of a second type. The existing session is using a mobile internet protocol address. On the wireless network of the first type, a session is assigned the mobile internet protocol address.

A method of operating a communication system is disclosed. A first communication session is established with a mobile station using a wireless network of a first type. The first communication session uses a mobile internet protocol address. The first communication session is associated with a first network access identifier. A request for network entry from the mobile station is received by a wireless network of a second type. A service continuity query is sent to a service node. An indicator associated with the first network access identifier is received from the service node. In response to receiving the indicator associated with the network access node, a second communication session is established with the mobile station using the wireless network of the second type. The second communication session uses the mobile internet protocol address. The second communication session is associated with a second network access identifier.

A communication system is disclosed. A first wireless network of a first type is configured to communicate with a wireless device using a mobile internet protocol address and a first network access identifier. The wireless device is associated with a first network access identifier by the first wireless network. A second wireless network of a second type is configured to receive an access request from the wireless device, query a service node with a second access identifier, receive an indicator associating the first network access identifier, the second network access identifier and the mobile internet protocol address, and, communicate with the wireless device using the second network access identifier and the mobile internet protocol address.

DETAILED DESCRIPTION

In an embodiment, a wireless device may be subscribed to a session continuity service. The session continuity service enables the wireless device to switch from one type of wireless service to another while keeping application sessions uninterrupted during the switchover between technologies. For example, a wireless device may switch between a WiMAX network and a CDMA network. The session continuity service allows the wireless device to switch between these two technologies while keeping the application sessions it is running uninterrupted.

The wireless device (a.k.a., mobile station) registers with a network of a first type (e.g., WiMAX) and receives a mobile Internet protocol (MIP) address. The wireless device is associated with a first network access identifier (NAI). The NAI associated with the wireless device may be different for each type of network the wireless device may connect to.

When the wireless device registers with the first type of network, the first type of network stores the mobile IP address assigned to the wireless device along with any NAI's that are associated with the wireless device on other networks. This information is replicated across the authentication servers of the other network types. In addition, this information may be replicated on a service node. The service node may be queried by all of the network types.

When the wireless device begins the process of registering with a new network type (e.g., CDMA), the new network queries its authentication server or the service node to determine if the wireless device already has an active session with a network of a different type (e.g., the first type). When the new network determines the wireless device already has an active session with a network of a different type, the network assigns the wireless device the same mobile IP address that the wireless device was using on the first network. The new network also receives information, either from the authentication server or the service node, which allow the new network to associate the appropriate NAI with the wireless device and the mobile IP address.

Figure 1:
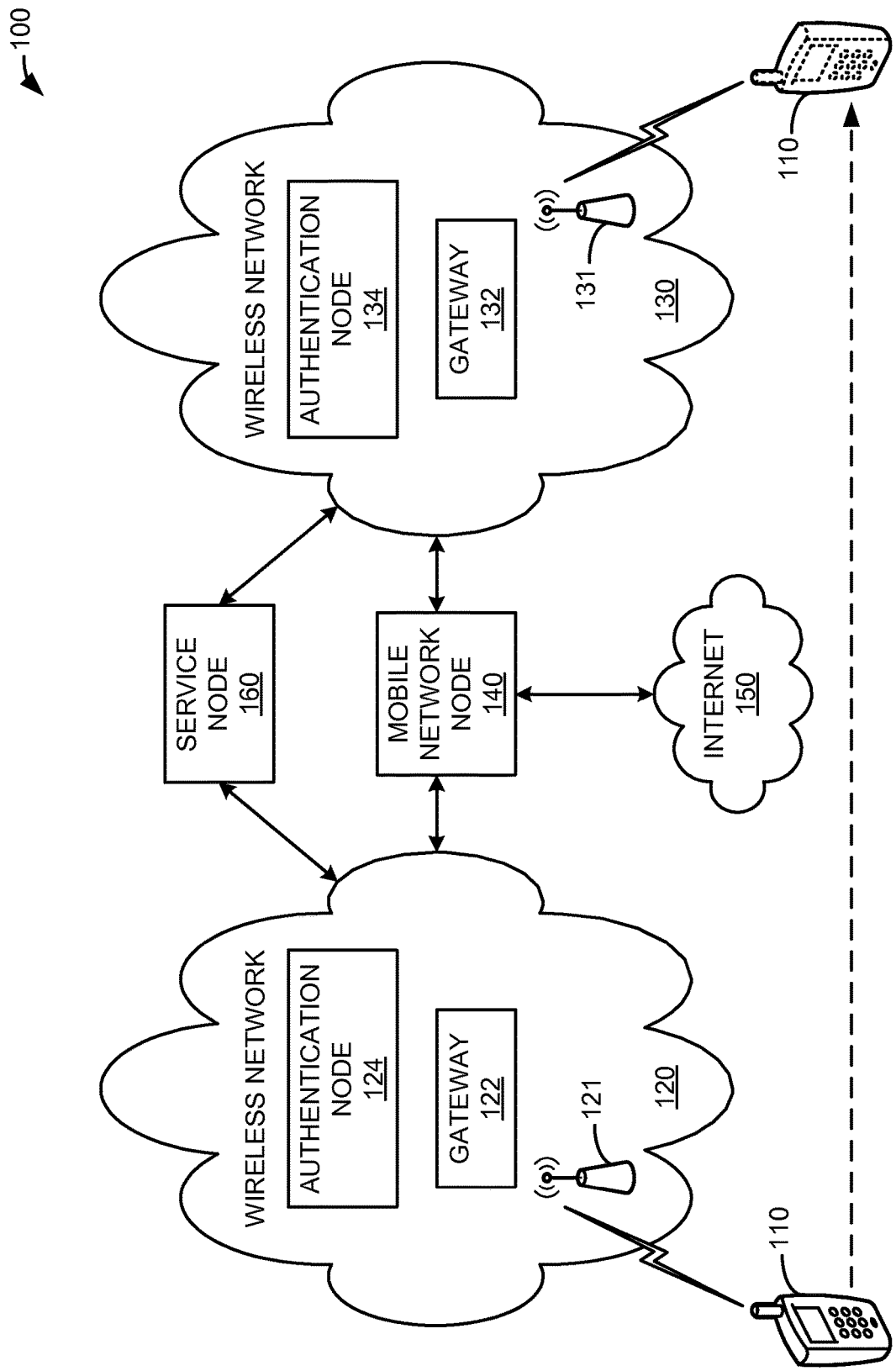
FIG. 1 is a block diagram illustrating a communication system.

FIG. 1 is a block diagram illustrating a communication system. In FIG. 1, communication system 100 comprises mobile station 110, wireless network 120, wireless network 130, mobile network node 140, Internet 150, and service node 160. Wireless network 120 includes base station 121, gateway 122, and authentication node 124. Wireless network 130 includes a station 131, gateway 132, and authentication node 134.

Service node 160 is operatively coupled wireless network 120. Service node 160 is operatively to coupled to wireless network 130. Mobile network node 140 is operatively coupled wireless network 120, wireless network 130, and Internet 150. Mobile station 110 may be operatively coupled to base station 121 via a wireless link of a first type. Mobile station 110 may be operatively coupled to base station 131 via a wireless link of a second type. For example, mobile station 110 may be operatively coupled to base station 121 using a wireless network protocol given by the WiMAX specifications. Mobile station 110 may be operatively coupled to base station 131 using a wireless network protocol given by the CDMA2000 specifications. Thus, mobile station 110 may exchange information with wireless network 120 and the elements therein. Likewise, mobile station 110 may exchange information with wireless network 130 in the elements therein.

Communication system 100 may comprise any two wireless networks 120 and 130 that provide communication, connectivity for mobile station 110 to communicate with other users or devices. Wireless network protocols that may be utilized by wireless networks 120 and 130 may include code division multiple access (CDMA) 1×RTT, Evolution-Data Optimized (EV-DO), EV-DO rev. A, Global System for Mobile communications (GSM), Universal Mobile Telecommunications System (UMTS), High-Speed Packet Access (HSPA), Third Generation Partnership Project Long Term Evolution (3GPP LTE), General Packet Radio Services (GPRS), Worldwide Interoperability for Microwave Access (WiMAX) and the like.

Mobile station 110 may be any device that has wireless communication connectivity that may be readily moved from one location to another. Mobile station 110 may include telephones, smart phones, mobile phones, cellular phones, data cards, personal digital assistants (PDAs), personal communicators, handheld game consoles, personal computers (PCs), Ultra-Mobile personal computers (UM-PCs) handheld televisions, televisions, and any other consumer appliance with wireless communication capabilities. In FIG. 1, mobile station 110's ability to move from one location to another is illustrated by a dashed line.

Base stations 121 and 131 may be any wireless system that provide a first and second, respectively, type of air interface to mobile station 110, and communication connectivity to the Internet 150 via mobile network node 140 and wireless networks 120 and 130, respectively. Examples of base stations that may be utilized include, base transceiver stations (BTSs), radio base stations (RBSs), Node B, enhanced Node B (eNBs) and others. Base stations may include a number of elements known to those skilled in the art comprising a transceiver, power amplifier, combiner, duplexer, antenna and control function.

Gateway 122 provides communication connectivity and acts as an aggregator of traffic or networking device between one or more base stations 121 or base station controllers (not shown) and wireless network 120. Gateway 132 provides communication connectivity and acts as an aggregator of traffic or networking device between one or more base stations 131 or base station controllers (not shown) and wireless network 130. Examples of gateways 122 and 132 may include an access service network gateway (ASN-GW), wireless local access network access gateway (WAG), packet data gateway (PDG), serving GPRS support node (SGSN), mobile switching center (MSC) and packet data serving node (PDSN).

Authentication node 124 provides the necessary authentication functions for wireless network 120 to allow mobile station 110 to gain access to wireless network 120, and thus communication system 100. Wireless network 120 may utilize more than one authentication node 124. Further, mobile station 110 may exchange information with any one of these authentication nodes 124. Authentication node 134 provides the necessary authentication functions for wireless network 130 to allow mobile station 110 to gain access to wireless network 130, and thus communication system 100. Wireless network 130 may utilize more than one authentication node 134. Mobile station 110 may exchange information with any of these authentication nodes 134. Authentication nodes 124 and 134 may exchange information with each other, other authentication nodes on other wireless networks (not shown), and/or service node 160. Authentication nodes 124 and 134 may comprise one or more authentication, authorization and accounting (AAA) servers or computing platforms.

Mobile network node 140 may comprise any network router that provides communication connectivity between wireless network 120 or wireless network 130, and Internet 150. Mobile station 110 may exchange information with mobile network node 140 to provide connectivity between mobile station 110 and Internet 150. Examples of mobile network node 140 may include one or more home agents (HAs), gateway GPRS support node (GGSN) and the like.

Service node 160 may include any computing platform or platforms that would provide certain network management functions for communication system 100. Examples of network management functions comprise controlling, planning, allocating, deploying, coordinating, and monitoring the resources of a network, including performing functions such as initial network planning, frequency allocation, predetermined traffic routing to support load balancing, cryptographic key distribution authorization, configuration management, fault management, security management, performance management, bandwidth management, and accounting management. Elements that may perform management functions comprise authentication servers, provisioning servers, security servers, billing platforms and any other platform that enables a network provider to manage its network. Service node 160 may also maintain subscriber information associated with users that have permission to utilize communication system 100, wireless network 120, and wireless network 130.

Internet 150 is any collection of interconnected computing networks that provide communication connectivity between users. Internet 150 may be publicly accessible or may be a collection of private or proprietary computing networks.

In an embodiment, service node 160 may store an attribute that indicates whether mobile station 110 may a utilize session continuity service between wireless networks 120 and 130. This attribute may be stored as part of a subscriber database that associates mobile station 110 with a user profile. The user profile may also associate mobile station 110 with all of the NAI's associated with mobile station 110 for each wireless network 120 and 130. A network access identifier (NAI) is a way of identifying users who request access to a network. An example syntax is "user@realm". NAIs are commonly found as user identifiers in the RADIUS and Diameter network access protocols and the EAP authentication protocol. Authentication nodes 124 and 134 may retrieve the NAI's stored by service node 160.

When mobile station 110 requests access to wireless network 120, authentication node 124 may query service node 160. In response to this query, service node 160 may return an indicator of whether mobile station 110 may utilize a session continuity service. If mobile station 110 is entitled to use the session continuity service, authentication node 124 may gather and store session information in a data session database. This stored data session information may include the IP address of mobile network node 140, NAI's associated with mobile station 110 by service node 160, and/or other attributes. In addition, authentication node 124 may replicate this information on remote authentication nodes (e.g., authentication node 134).

When mobile station 110 requests access to wireless network 130, authentication node 134 may examine its stored data session information to determine whether mobile station 110 already has established a data session with wireless network 120. Authentication node 134 may supply one or more NAIs, and a mobile IP address, to mobile network node 140 via an authentication response message. The one or more NAIs, and the mobile IP address assigned to mobile station 110 by wireless network 120, may be supplied to mobile network node 140 by encapsulating them in an authentication response message.

After receiving the NAIs from authentication node 134, mobile network node 140 may check if one of the NAIs matches an NAI of an active and previously stored data session. If mobile network node 140 determines there is a match between one of the NAI's received from authentication node 134 and an active data session, mobile network node 140 may bring up a new session with mobile station 110 via wireless network 130 that uses the same mobile IP address as the previously established data session with wireless network 120. Mobile network node 140 may then deregister or terminate mobile station 110's previously established data session with wireless network 120.

In an embodiment, mobile network node 140 may not be required to authenticate mobile station 110 when mobile station 110 seeks to register with wireless network 130. For example, a CDMA mobile IP network may not require mobile network node 140 to authenticate with authentication node 134. In this case, mobile network node 140 may check to see if a received NAI from mobile station 110 is included in session information stored by mobile network node 140. If the received NAI is included in session information stored by mobile network node 140, mobile network node 140 may bring up a new session with mobile station 110 via wireless network 130 that uses the same mobile IP address as the previously established data session with wireless network 120. Mobile network node 140 may then deregister or terminate mobile station 110's previously established data session with wireless network 120.

Figure 2:
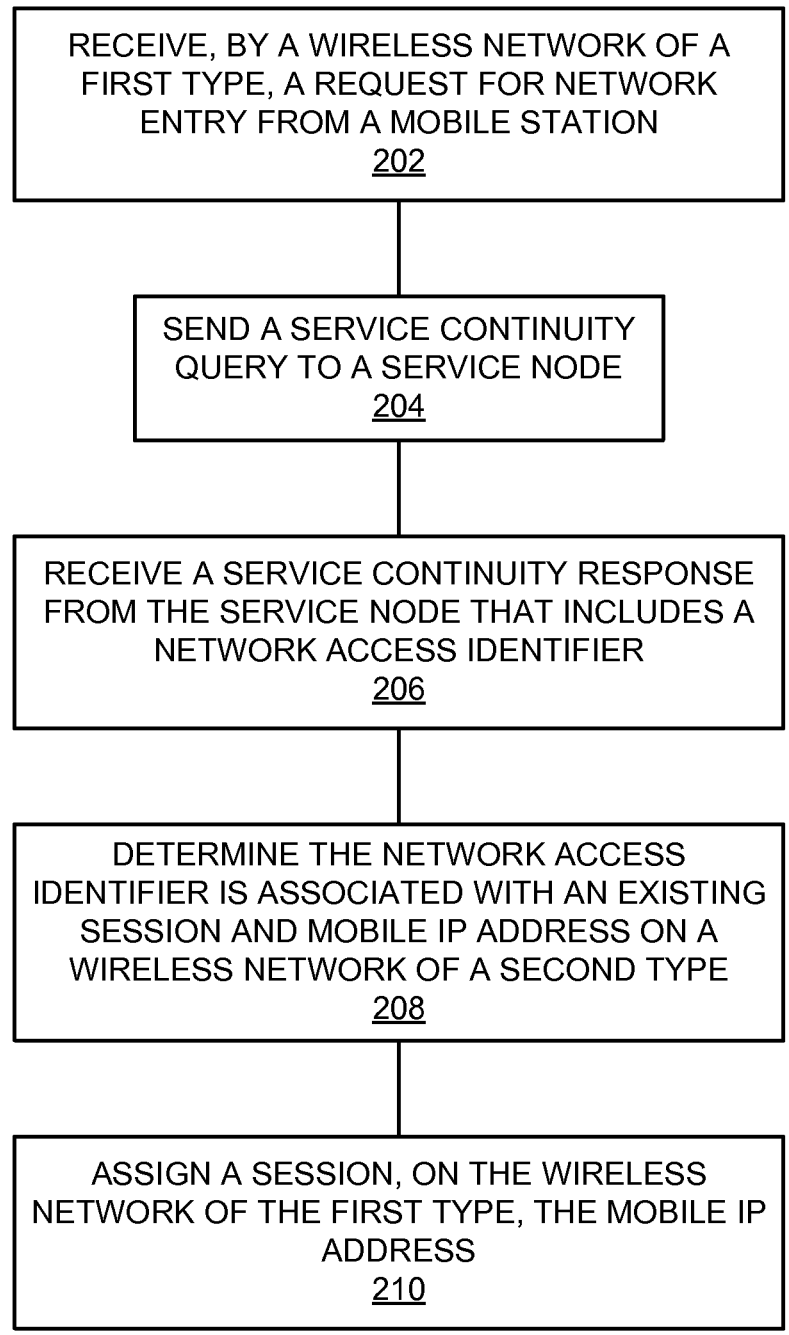
FIG. 2 is a flowchart illustrating a method of operating a communication system.

FIG. 2 is a flowchart illustrating a method of operating a communication system. The steps illustrated in FIG. 2 may be performed by one or more elements of communication system 100.

A request for network entry from a mobile station is received by a wireless network of a first type (202). For example, wireless network 130 may receive a request for network entry from mobile station 110. Mobile station 110 may already have a data session established with wireless network 120. This data session may be associated with a mobile IP address assigned by wireless network 120. This data session may also be associated with a network access identifier that is associated with mobile station 110 by wireless network 120.

A service continuity query is sent to a service node (204). For example, authentication node 134 may send a service continuity query to service node 160. A service continuity response is received from the service node that includes a network access identifier (206). For example, authentication node 134 may receive from service node 160 a service continuity response. The service continuity response may include one or more network access identifiers associated with mobile station 110. This service continuity response include one or more network access identifiers associated with a data session established between mobile station 110 and wireless network 120. The service continuity response may include one or more network access identifiers associated with a data session established between mobile station 110 and mobile network node 140.

The network access identifier is determined to be associated with an existing session and mobile IP address on a wireless network of a second type (208). For example, authentication node 134, mobile network node 140, or service node 160 may determine that the network access identifier received in block 206 is associated with an existing data session established via wireless network 120. This network access identifier may also be associated with a mobile IP address being used by wireless network 120 to communicate with mobile station 110.

On the wireless network of the first type, the session is assigned the mobile IP address (210). For example, a data session associated with mobile station 110 on wireless network 130 may be assigned the mobile IP address previously used by a data session associated with mobile station 110 on wireless network 120.

Figure 3:
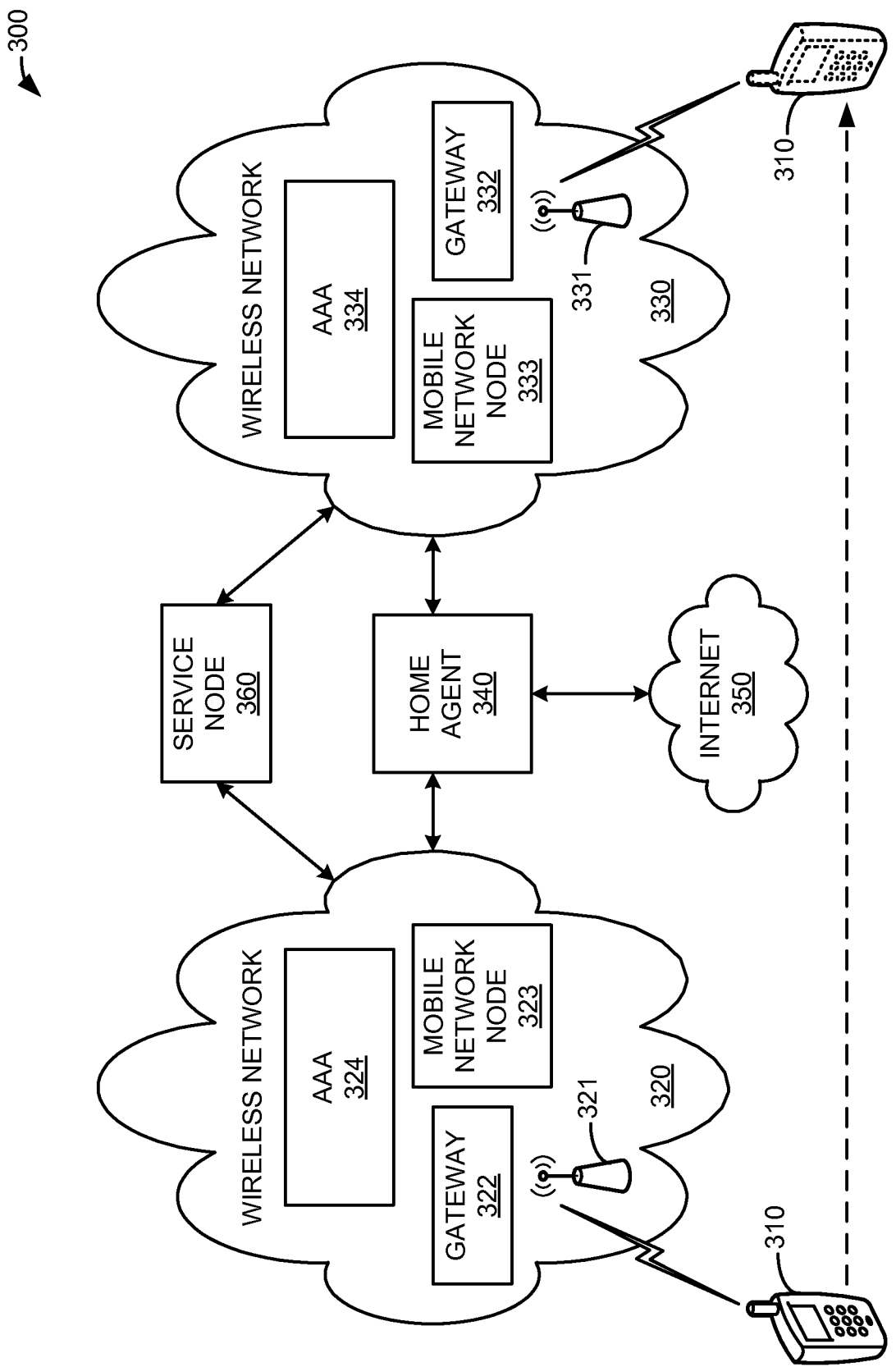
FIG. 3 is a block diagram illustrating a multi-technology wireless communication system.

FIG. 3 is a block diagram illustrating a multi-technology wireless communication system. In FIG. 3, communication system 300 comprises mobile station 310, wireless network 320, wireless network 330, home agent 340, Internet 350, and service node 360. Wireless network 320 includes base station 321, gateway 322, mobile network node 323, and AAA 324. Wireless network 330 includes base station 331, gateway 332, mobile network node 333, and AAA 334.

Service node 360 is operatively coupled wireless network 320. Service node 360 is operatively coupled to wireless network 330. Home agent 340 is operatively coupled to wireless network 320, wireless network 330, and Internet 350. Mobile station 310 may be operatively coupled to base station 321 via a wireless link of a first type. Mobile station 310 may be operatively coupled to base station 331 via a wireless link of a second type. For example, mobile station 310 may be operatively coupled to base station 321 using a wireless network protocol given by the WiMAX specifications. Mobile station 310 may be operatively coupled to base station 331 using a wireless network protocol given by the CDMA2000 specifications. Thus, mobile station 310 may exchange information with wireless network 320 and the elements therein. Likewise, mobile station 310 may exchange information with wireless network 330 and the elements therein.

Communication system 300 may comprise any two wireless networks 320 and 330 that provide communication, connectivity for mobile station 310 to communicate with other users or devices. Wireless network protocols that may be utilized by wireless networks 320 and 330 may include code division multiple access (CDMA) 1×RTT, Evolution-Data Optimized (EV-DO), EV-DO rev. A, Global System for Mobile communications (GSM), Universal Mobile Telecommunications System (UMTS), High-Speed Packet Access (HSPA), Third Generation Partnership Project Long Term Evolution (3GPP LTE), General Packet Radio Services (GPRS), Worldwide Interoperability for Microwave Access (WiMAX) and the like.

Mobile station 310 may be any device that has wireless communication connectivity that may be readily moved from one location to another. Mobile station 310 may include telephones, smart phones, mobile phones, cellular phones, data cards, personal digital assistants (PDAs), personal communicators, handheld game consoles, personal computers (PCs), Ultra-Mobile personal computers (UM-PCs) handheld televisions, televisions, and any other consumer appliance with wireless communication capabilities. In FIG. 3, mobile station 310's ability to move from one location to another is illustrated by a dashed line.

Base stations 321 and 331 may be any wireless systems that provide two different types of air interfaces to mobile station 310, and communication connectivity to the Internet 350 via home agent 340 and wireless networks 320 and 330, respectively. Examples of base stations that may be utilized include, base transceiver stations (BTSs), radio base stations (RBSs), Node B, enhanced Node B (eNBs) and others. Base stations may include a number of elements known to those skilled in the art comprising a transceiver, power amplifier, combiner, duplexer, antenna and control function.

Gateway 322 provides communication connectivity and acts as an aggregator of traffic or networking device between one or more base stations 321 or base station controllers (not shown) and wireless network 320. Gateway 332 provides communication connectivity and acts as an aggregator of traffic or networking device between one or more base stations 331 or base station controllers (not shown) and wireless network 330. Examples of gateways 322 and 332 may include an access service network gateway (ASN-GW), wireless local access network access gateway (WAG), packet data gateway (PDG), serving GPRS support node (SGSN), mobile switching center (MSC) and packet data serving node (PDSN).

AAA 324 provides authentication functions for wireless network 320 to allow mobile station 310 to gain access to wireless network 320, and thus communication system 300. Wireless network 320 may utilize more than one AAA 324. Further, mobile station 310 may exchange information with any one of these AAAs 324. AAA 334 provides authentication functions for wireless network 330 to allow mobile station 310 to gain access to wireless network 330, and thus communication system 300. Wireless network 330 may utilize more than one AAA 334. Mobile station 310 may exchange information with any one of these AAAs 334. AAAs 324 and 334 may exchange information with each other, other AAAs on other wireless networks (not shown), and/or service node 360. AAAs 324 and 334 may comprise one or more authentication, authorization and accounting (AAA) servers or computing platforms.

Home agent 340 may comprise any network router that provides communication connectivity between wireless network 320 or wireless network 330, and Internet 350. Mobile station 310 may exchange information with home agent 340 to provide connectivity between mobile station 310 and Internet 350.

Service node 360 may include any computing platform or platforms that would provide certain network management functions for communication system 300. Examples of network management functions comprise controlling, planning, allocating, deploying, coordinating, and monitoring the resources of a network, including performing functions such as initial network planning, frequency allocation, predetermined traffic routing to support load balancing, cryptographic key distribution authorization, configuration management, fault management, security management, performance management, bandwidth management, and accounting management. Elements that may perform management functions comprise authentication servers, provisioning servers, security servers, billing platforms and any other platform that enables a network provider to manage its network. Service node 360 may also maintain subscriber information associated with users that have permission to utilize communication system 300, wireless network 320, and wireless network 330.

Internet 350 is any collection of interconnected computing networks that provide communication connectivity between users. Internet 350 may be publicly accessible or may be a collection of private or proprietary computing networks.

Mobile network nodes 323 and 333 may comprise any computing element or network router that provides information or communication connectivity inside or to the outside of wireless networks 320 and 330 respectively. Mobile network nodes 323 and 333 may include any computing platform or platforms that can provide certain network management functions for communication system 300. Examples of network management functions comprise controlling, planning, allocating, deploying, coordinating, and monitoring the resources of a network, including performing functions such as initial network planning, frequency allocation, predetermined traffic routing to support load balancing, cryptographic key distribution authorization, configuration management, fault management, security management, performance management, bandwidth management, and accounting management. Elements that may perform management functions comprise authentication servers, provisioning servers, security servers, billing platforms and any other platform that enables a network provider to manage its network. Mobile network nodes 323 and 333 may also store subscriber information associated with users that have permission to utilize communication system 300, wireless network 320, and wireless network 330.

In an embodiment, service node 360, mobile network node 323, and/or mobile network node 333 may store an attribute that indicates whether mobile station 310 may utilize a session continuity service between wireless networks 320 and 330. This attribute may be stored as part of a subscriber database that associates mobile station 310 with a user profile. The user profile may also associate mobile station 310 with all of the NAI's associated with mobile station 310 for each wireless network 320 and 330. A network access identifier is a way of identifying users who request access to a network. A common syntax is "user@realm". NAIs are commonly found as user identifiers in the RADIUS and Diameter network access protocols and the EAP authentication protocol. AAAs 324 and 334 may retrieve the NAI's stored by service node 360, mobile network node 323, and/or mobile network node 333.

When mobile station 310 requests access to wireless network 320, AAA 324 may query service node 360, mobile network node 323, and/or mobile network node 333. In response to this query, service node 360, mobile network node 323, and/or mobile network node 333 may return an indicator of whether mobile station 310 may utilize session continuity service. If mobile station 310 is entitled to use the session continuity service, AAA 324 may gather and store session information in a data session database. This stored data session information may include the IP address of home agent 340, and NAI's associated with mobile station 310 by service node 360, mobile network node 323, and/or mobile network node 333. In addition, AAA 324 may replicate this information on remote AAAs (e.g., AAA 334), service node 360, mobile network node 323, and/or mobile network node 333.

When mobile station 310 requests access to wireless network 330, AAA 334 may examine its stored data session information to determine whether mobile station 310 already has established a data session with wireless network 320. AAA 334 may supply one or more NAIs, and a mobile IP address, to home agent 340 via an authentication response message. The one or more NAIs, and the mobile IP address assigned to mobile station 310 by wireless network 320, may be supplied to home agent 340 by encapsulating them in an authentication response message.

After receiving the NAIs from AAA 334, home agent 340 may check if one of the NAIs matches an NAI of an active and previously stored data session. If home agent 340 determines there is a match between one of the NAI's received from AAA 334 and an active data session, home agent 340 may bring up a new session with mobile station 310 via wireless network 330 that uses the same mobile IP address as the previously established data session with wireless network 320. Home agent 340 may then deregister or terminate mobile station 310's previously established data session with wireless network 320.

In an embodiment, home agent 340 may not be required to authenticate mobile station 310 when mobile station 310 starts to register with wireless network 330. For example, a CDMA mobile IP network may not require home agent 340 to authenticate to AAA 334. In this case, home agent 340 may check to see if a received NAI from mobile station 310 is included in session information stored by home agent 340. If the received NAI is included in session information stored by home agent 340, home agent 340 may bring up a new session with mobile station 310 via wireless network 330 that uses the same mobile IP address as the previously established data session with wireless network 320. Home agent 340 may then deregister or terminate mobile station 310's previously established data session with wireless network 320.

Figure 4:
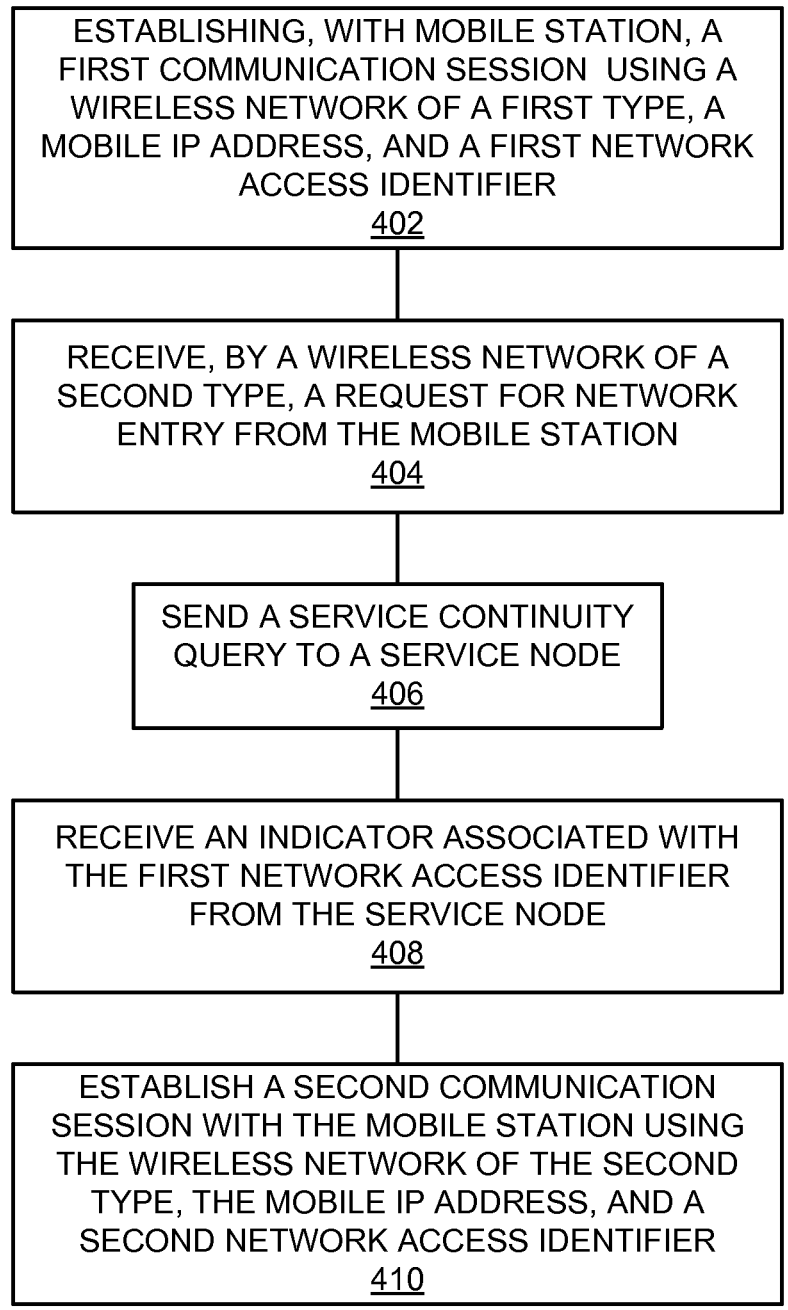
FIG. 4 is a flowchart illustrating a method of operating a communication system.

FIG. 4 is a flowchart illustrating a method of operating a communication system. The steps illustrated in FIG. 4 may be performed by one or more elements of communication system 100 or communication system 300.

A first communication session, using a wireless network of a first type, is established with a mobile station using a mobile IP address and a first network access identifier (402). For example, wireless network 320 may establish a first communication session with mobile station 310. This first communication session may use a mobile IP address for communication between mobile station 310 and Internet 350 via wireless network 320. This communication session may be routed via base station 321, gateway 322, mobile network node 323, and/or home agent 340. Mobile station 310 may use, or be associated with, a first network access identifier during this communication session with wireless network 320.

A request for network entry from the mobile station is received by a wireless network of a second type (404). For example, wireless network 330 may receive a request for network entry from mobile station 310. This request for network entry may be in the form of a ranging request. This request for network entry may be received by wireless network 330 while mobile station 310 has a currently active session with wireless network 320. The currently active session with wireless network 320 may be associated with the mobile IP address and the first network access identifier.

A service continuity query is sent to a service node (406). For example, AAA 334, or another element of wireless network 330, may send a service continuity query to service node 360. This service continuity query may seek information relating to whether mobile station 310 is subscribed to a service continuity service. The service continuity query may also seek information relating to any currently active sessions with mobile station 310 that are being carried via other wireless networks (e.g., wireless network 320).

An indicator associated with the first network access identifier is received from the service node (408). For example, AAA 334, or another element of wireless network 330, may receive an indicator associated with the network access identifier used by mobile station 310 to access wireless network 320. AAA 334, or another element of wireless network 330, may receive this indicator from service node 360. AAA 334, or another element of wireless network 330, may receive an indicator associated with a mobile IP address. The mobile IP address may be associated with one or more network access identifiers associated with mobile station 310. These network access identifiers may include the network access identifiers used, or to be used, by mobile station 310 to access wireless network 320 and/or wireless network 330.

A second communication session is established with the mobile station using the wireless network of the second type, the mobile IP address, and a second network access identifier (410). For example, a second communication session may be established between wireless network 330 and mobile station 310. The second communication session may be established before the first communication session with wireless network 320 is terminated. The second communication session may be established with wireless network 330 and use the same mobile IP address as the first communication session. Mobile station 310 may use a second network access identifier to access wireless network 330 when establishing the second communication session.

Figure 5:
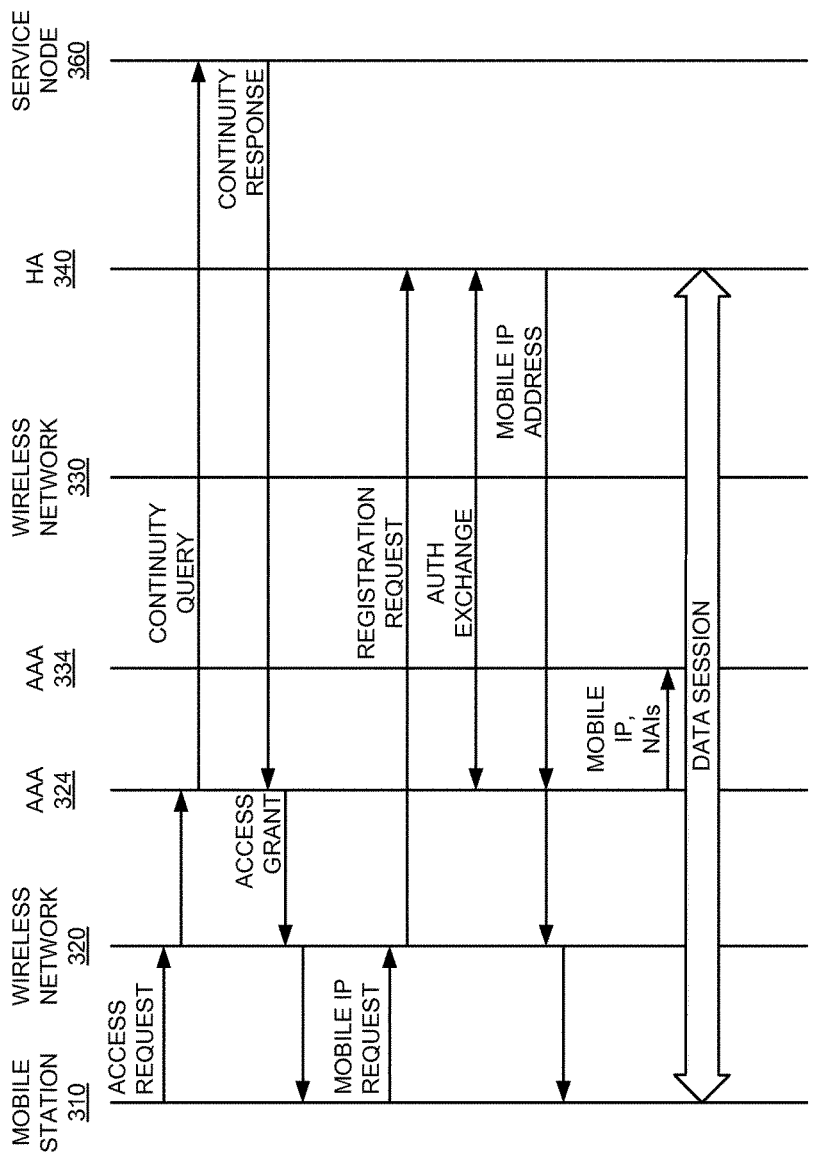
FIG. 5 is a flow diagram illustrating the operation of assigning a mobile internet protocol address and propagating session information to an additional wireless technology network.

FIG. 5 is a flow diagram illustrating the operation of assigning a mobile internet protocol address and propagating session information to an additional wireless technology network. An access request is received by wireless network 320 transferred from the mobile station 310. This access request, or a message based on it, is transferred from an element of wireless network 320 to AAA 324. A continuity query message is transferred from AAA 324 to service node 360. The continuity query message may comprise a user identifier. A user identifier may include any identifier associating a user to mobile station 310. Examples of user identifiers may include a username and password, network access identifier, media access control address, digital certificates, tokens, phone numbers and any other similar identifier. Collectively or individually, these user identifiers may also be referred to as network access identifiers.

A continuity response message is transferred from service node 360 to AAA 324. This continuity response message may comprise an indicator associated with whether mobile station 310 is subscribed to a session continuity service. The continuity response message may comprise one or more network access identifiers that may be used by mobile station 310 to access wireless network 320, or other networks.

An access grant message is transferred from AAA 324 via wireless network 320 to mobile station 310. A request for a mobile IP address is transferred from mobile station 310 to wireless network 320. A mobile IP address may include any Internet protocol (IP) address that is associated with mobile station 310 where mobile station 310 has the ability to move and exchange information with one network, or network element, at one location and then with another network, or network element, when the mobile station 310 is at another location while maintaining the same mobile IP address (as illustrated in FIGS. 1 and 3 by the dashed lines).

A registration request is transferred from an element of wireless network 320 to home agent 340. Home agent 340 and AAA 324 may perform an authentication process by exchanging messages. Examples of authentication processes are those specified by RADIUS authentication protocol, extensible authentication protocol (EAP), challenge handshake authentication protocol (CHAP), and the like.

Home agent 340 transfers a mobile IP address to AAA 324. This mobile IP address is also transferred to mobile station 310 via wireless network 320. AAA 324 propagates this mobile IP address and any network access identifiers associated with mobile station 310 to one or more AAAs (e.g., AAA 334). A data session is then established between mobile station 310 and home agent 340. Thus, mobile station 310 may exchange communication with Internet 350 via home agent 340.

Figure 6:
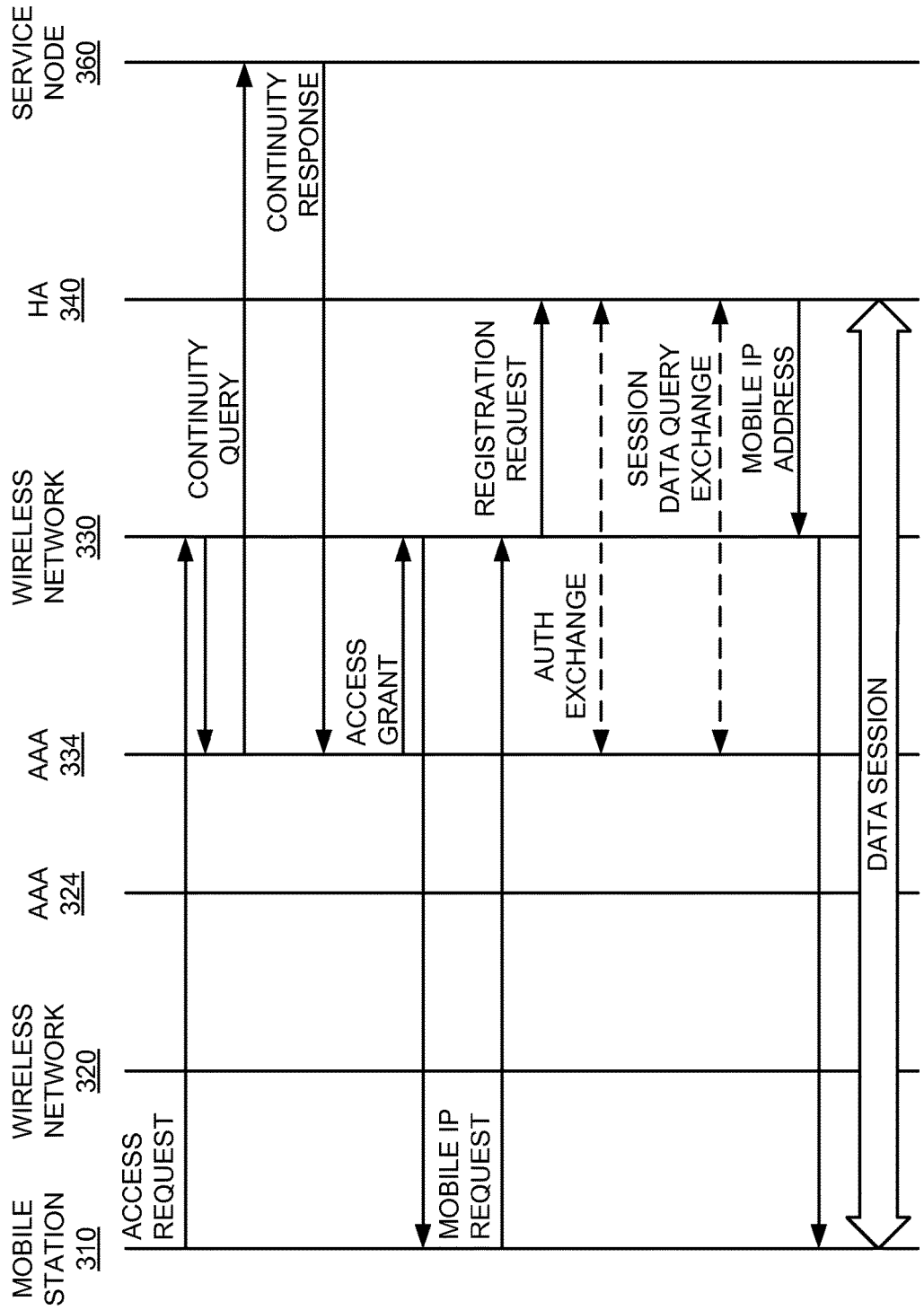
FIG. 6 is a flow diagram illustrating the operation of maintaining session continuity when switching between wireless networks that use different wireless technologies.

FIG. 6 is a flow diagram illustrating the operation of maintaining session continuity when switching between wireless networks that use different wireless technologies. An access request is transferred from mobile station 310 to wireless network 330. This access request, or a message based on it, is transferred to AAA 334. AAA 334 transfers a continuity query to service node 360. Service node 360 transfers a continuity response to AAA 334. AAA 334 transfers an access grant message to mobile station 310 via wireless network 330. Mobile station 310 transfers a mobile IP request to wireless network 330. Wireless network 330 transfers a registration request to home agent 340.

If wireless network 330 requires authentication, home agent 340 and AAA 334 may perform an authentication exchange. During this authentication exchange home agent 340 may receive information about sessions mobile station 310 has currently active with other wireless networks (e.g., wireless network 320). AAA 334 may have received this information during the process described in FIG. 5. This information may include a mobile IP address assigned by the other network to mobile station 310. This information may also include one or more network access identifiers associated with mobile station 310.

If wireless network 330 does not require authentication (because, for example, mobile station 310 is already registered with home agent 340) then home agent 340 may query AAA 334 for data about any sessions mobile station 310 has active with other wireless networks (e.g., wireless network 320). This information may include a mobile IP address assigned by the other network to mobile station 310. This information may also include one or more network access identifiers associated with mobile station 310.

Home agent 340 may send a mobile IP address to wireless network 330 for relay to mobile station 310. This mobile IP address may be the same mobile IP address assigned to mobile station 310 on another network (e.g., wireless network 320). A data session is then established between mobile station 310 and home agent 340. Thus, mobile station 310 may exchange communication with Internet 350 via home agent 340 using the same mobile IP address as mobile station 310 used immediately prior to registering with a wireless network of a different type. Mobile station 310 may exchange communication with Internet 350 via home agent 340 using the same mobile IP address but a different network access identifier.

Figure 7:
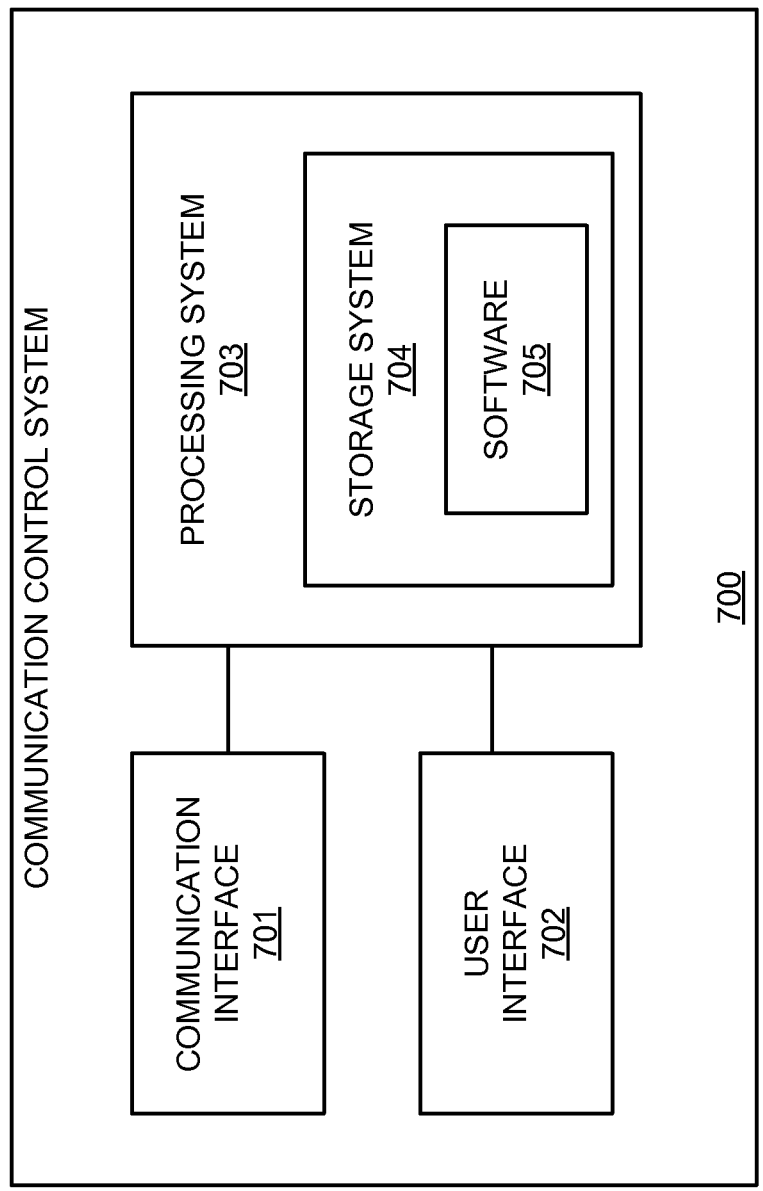
FIG. 7 is a block diagram of a communication control system.

FIG. 7 illustrates communication control system 700. Communication control system 700 may be an example of one or more components of communication system 100 or communication system 300. This includes, but is not limited to authentication node 124, authentication node 134, AAA 324, AAA 334, mobile network node 140, home agent 340, service node 160, and/or service node 360, although these and other systems may use alternative configurations. Communication control system 700 comprises communication interface 701, user interface 702, and processing system 703. Processing system 703 is linked to communication interface 701 and user interface 702. Processing system 703 includes storage system 704 that stores software 705.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof.

User interface 702 comprises components that interact with a user. User interface 702 may include a keyboard, display screen, mouse, touch pad, or some other user input/output apparatus. User interface 702 may be omitted in some examples.

Processing system 703 may comprise a microprocessor and other circuitry that retrieves and executes software 705 from storage system 704. Storage system 704 may comprise a disk drive, flash drive, data storage circuitry, or some other memory apparatus. Software 705 comprises computer programs, firmware, or some other form of machine-readable processing instructions. Software 705 may include an operating system, utilities, drivers, network interfaces, applications, or some other type of software. When executed by processing system 703, software 705 directs processing system 703 to operate communication control system 700 as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, the method comprising:

establishing a communication session with a mobile station over a wireless network of a first type, wherein establishing the communication session includes assigning a mobile internet protocol address to the mobile station and associating the mobile station with a network access identifier, and wherein the mobile station initiates an application session during the communication session;

receiving, by a wireless network of a second type, a request for network entry from the mobile station;

sending a service continuity query to a service node to determine if the mobile station is subscribed to a session continuity service, wherein the service node stores an attribute that indicates that the mobile station is entitled to utilize the session continuity service between the wireless network of the first type and the wireless network of the second type;

in the service node, responsive to the service continuity query, determining that the mobile station is subscribed to the session continuity service based on the attribute that indicates that the mobile station is entitled to utilize the session continuity service and transmitting a service continuity response comprising an indicator that indicates the mobile station is subscribed to the session continuity service;

receiving from the service node the service continuity response comprising the indicator that indicates the mobile station is subscribed to the session continuity service, the service continuity response including the network access identifier and the mobile internet protocol address;

determining that the network access identifier is associated with the communication session active on the wireless network of the first type; and responsive to receiving the service continuity response comprising the indicator that indicates the mobile station is subscribed to the session continuity service and to determining that the network access identifier is associated with the communication session active on the wireless network of the first type, assigning a new communication session, on the wireless network of the second type, the mobile internet protocol address, wherein the application session continues uninterrupted on the new communication session.

2. The method of claim 1, further comprising:

receiving the network access identifier at a first authentication node associated with the wireless network of the second type.

3. The method of claim 2, further comprising;

sending the network access identifier to a second authentication node, the second authentication node associated with the wireless network of the first type.

4. The method of claim 3, wherein the second authentication node sends the network access identifier to the first authentication node.

5. The method of claim 1, further comprising:

receiving the network access identifier at a first mobile network internet node associated with the wireless network of the second type.

6. The method of claim 5, wherein an authentication node associated with the wireless network of the first type provides the network access identifier to the first mobile network internet node.

7. The method of claim 1, wherein the service node provides the network access identifier to the wireless network of the first type and to the wireless network of the second type.

8. The method of claim 1, wherein the service node provides the service continuity response to the wireless network of the second type and a second service continuity response to the wireless network of the first type.

9. A method of operating a communication system, the method comprising:

establishing a first communication session with a mobile station using a wireless network of a first type, the first communication session using a mobile internet protocol address, the first communication session associated with a first network access identifier, wherein the mobile station initiates an application session during the first communication session;

receiving, by a wireless network of a second type, a request for network entry from the mobile station;

sending a service continuity query to a service node to determine if the mobile station is subscribed to a session continuity service, wherein the service node stores an attribute that indicates that the mobile station is entitled to utilize the session continuity service between the wireless network of the first type and the wireless network of the second type;

in the service node, responsive to the service continuity query, determining that the mobile station is subscribed to the session continuity service based on the attribute that indicates that the mobile station is entitled to utilize the session continuity service and transmitting a service continuity response comprising an indicator associated with the first network access identifier that indicates the mobile station is subscribed to the session continuity service;

receiving from the service node the service continuity response comprising the indicator associated with the first network access identifier that indicates the mobile station is subscribed to the session continuity service, the service continuity response including the mobile internet protocol address; and in response to receiving the service continuity response comprising the indicator associated with the first network access identifier that indicates the mobile station is subscribed to the session continuity service, determining that the first network access identifier is associated with the first communication session active on the wireless network of the first type and establishing a second communication session with the mobile station using the wireless network of the second type, the second communication session using the mobile internet protocol address, the second communication session associated with a second network access identifier, wherein the application session continues uninterrupted on the second communication session.

10. The method of claim 9, further comprising:

receiving the first network access identifier at a second authentication node associated with the wireless network of the second type.

11. The method of claim 10, further comprising;

sending the first network access identifier to the second authentication node from a first authentication node, the first authentication node associated with the wireless network of the first type.

12. The method of claim 9, further comprising:

associating the second network access identifier with the first network access identifier.

13. The method of claim 9, further comprising:
associating the second network access identifier with the first communication session with the mobile station.

14. The method of claim 9, further comprising:
receiving, from the service node, a continuity indicator associated with the mobile station that determines whether the mobile station will use the mobile internet protocol address during the second communication session that the mobile station previously used during at least a portion of the first communication session.

15. The method of claim 9, further comprising:
disconnecting the first communication session.

16. The method of claim 9, wherein the service node provides the first network access identifier to the wireless network of the second type.

17. The method of claim 9, wherein the service node provides a service continuity response comprising the indicator associated with the first network access identifier to the wireless network of the second type.

18. A communication system comprising:
a first wireless network of a first type configured to communicate with a wireless device using a mobile internet protocol address and a first network access identifier, the wireless device being associated with the first network access identifier by the first wireless network, wherein the wireless device initiates an application session using the first wireless network;
a second wireless network of a second type configured to receive an access request from the wireless device and transmit a service continuity query to a service node with a second network access identifier to determine if the mobile station is subscribed to a session continuity service, wherein the service node stores an attribute that indicates that the wireless device is entitled to utilize the session continuity service between the first wireless network of the first type and the second wireless network of the second type, and wherein the service node is configured to, responsive to the service continuity query, determine that the wireless device is subscribed to the session continuity service based on the attribute that indicates that the wireless device is entitled to utilize the session continuity service, and transmit a service continuity response comprising an indicator that indicates the wireless device is subscribed to the session continuity service; and
the second wireless network of the second type configured to receive from the service node the service continuity response comprising the indicator that indicates the wireless device is subscribed to the session continuity service, the service continuity response associating the first network access identifier, the second network access identifier and the mobile internet protocol address, and in response to the service continuity response comprising the indicator that indicates the wireless device is subscribed to the session continuity service, communicate with the wireless device using the second network access identifier and the mobile internet protocol address, wherein the application session continues uninterrupted on the second wireless network.

19. The communication system of claim 18, further comprising:
a first authentication node configured to receive a first indicator of an association between the first network access identifier and the second network access identifier.

20. The communication system of claim 19, wherein the first authentication node is configured to provide a second indicator of an association between the first network access identifier and the second network access identifier to a second authentication node.

* * * * *